(12) United States Patent
Cherkasova et al.

(10) Patent No.: US 9,141,430 B2
(45) Date of Patent: Sep. 22, 2015

(54) SCHEDULING MAPREDUCE JOB SETS

(75) Inventors: Ludmila Cherkasova, Sunnyvale, CA (US); Abhishek Verma, Chapmaign, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 13/460,687

(22) Filed: Apr. 30, 2012

(65) Prior Publication Data

US 2013/0290976 A1    Oct. 31, 2013

(51) Int. Cl.
*G06F 9/46*    (2006.01)
*G06F 9/50*    (2006.01)

(52) U.S. Cl.
CPC ...... *G06F 9/5038* (2013.01); *G06F 2209/5017* (2013.01)

(58) Field of Classification Search
None
See application file for complete search history.

(56) References Cited

U.S. PATENT DOCUMENTS

| | | | | |
|---|---|---|---|---|
| 2008/0148266 | A1* | 6/2008 | Caselli et al. | 718/102 |
| 2011/0307899 | A1* | 12/2011 | Lee et al. | 718/104 |
| 2012/0110047 | A1* | 5/2012 | Hildrum et al. | 708/104 |
| 2012/0159506 | A1* | 6/2012 | Barham et al. | 718/104 |
| 2012/0284727 | A1* | 11/2012 | Kodialam et al. | 718/103 |
| 2012/0311581 | A1* | 12/2012 | Balmin et al. | 718/100 |
| 2013/0204991 | A1* | 8/2013 | Skjolsvold et al. | 709/223 |

OTHER PUBLICATIONS

Aboulnaga et al, Packing the Most Onto Your Cloud, CouldDB'09, ACM, Nov. 2009, pp. 25-28.*
Zaharia, Job Scheduling with the Fair and Capacity Schedulers, Hadoop Submit 2009, 30 pages.*
Verma et al., ARIA: Automatic Resource Inference and Allocation for MapReduce Environments, ACM, Jun. 2011, 10 pages.*
Sachin, 24 Hadoop Interview Questions and Answers for MapReduce developers; FromDev, 2010, 13 pages.*
Verma, Abhishek et al., "Play it Again, SimMR!," Hewlett-Packard Labs, pp. 9 (2011).

* cited by examiner

*Primary Examiner* — Diem Cao
(74) *Attorney, Agent, or Firm* — Dicke, Billig & Czaja, PLLC (PAT)

(57) ABSTRACT

Determining a schedule of a batch workload of MapReduce jobs is disclosed. A set of multi-stage jobs for processing in a MapReduce framework is received, for example, in a master node. Each multi-stage job includes a duration attribute, and each duration attribute includes a stage duration and a stage type. The MapReduce framework is separated into a plurality of resource pools. The multi-stage jobs are separated into a plurality of subgroups corresponding with the plurality of pools. Each subgroup is configured for concurrent processing in the MapReduce framework. The multi-stage jobs in each of the plurality of subgroups are placed in an order according to increasing stage duration. For each pool, the multi-stage jobs in increasing order of stage duration are sequentially assigned from either a front of the schedule or a tail of the schedule by stage type.

19 Claims, 3 Drawing Sheets

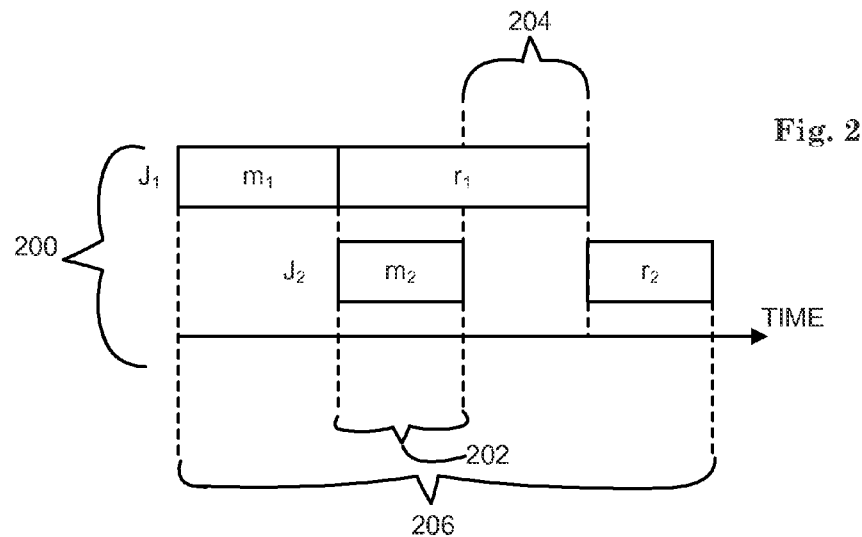
Fig. 2
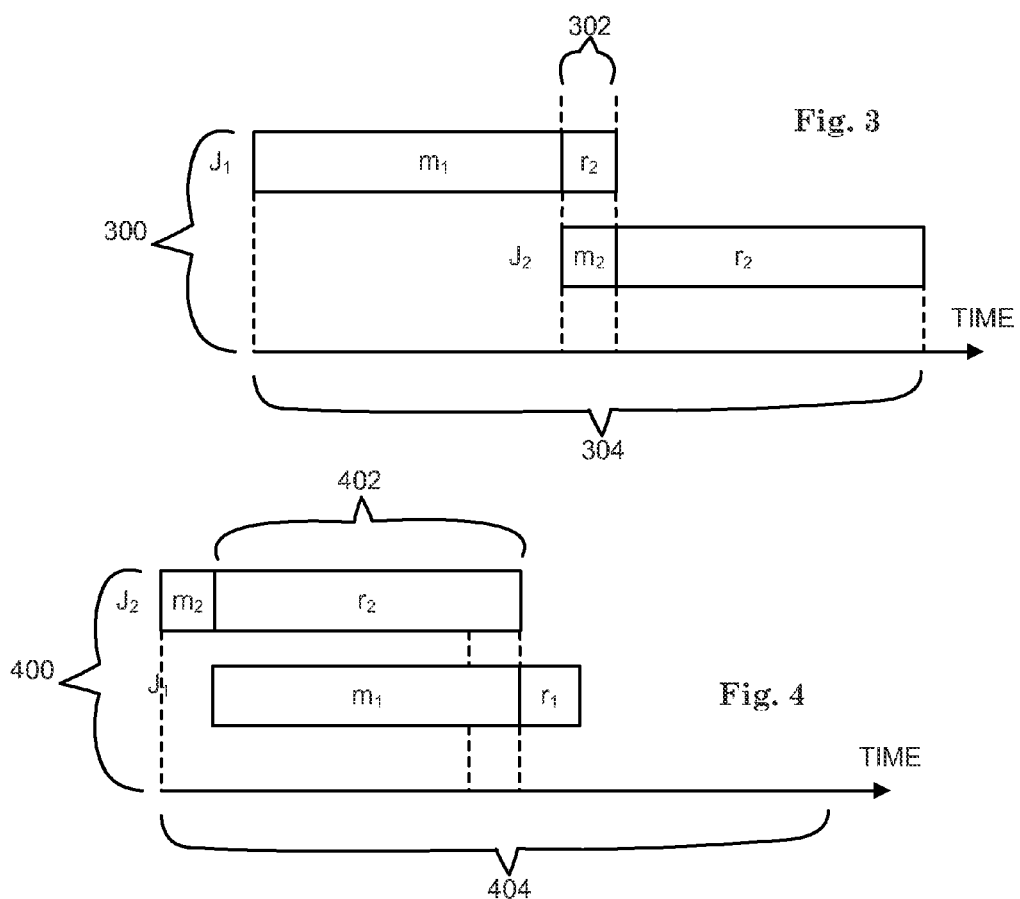
Fig. 3
Fig. 4

SCHEDULING MAPREDUCE JOB SETS

BACKGROUND

MapReduce is the name of several software frameworks used to support scalable distributed processing on large data sets stored in a file system over a large set of computing nodes of a distributed processing system. Many enterprises rely on timely analysis of the MapReduce framework and its open-source implementation Hadoop as a platform choice for efficient processing and advanced analytics over large amounts of unstructured information.

MapReduce includes map and reduce functions that are defined differently than those terms are understood in functional programming. As part of a map function, a master node receives an input, divides the input into smaller projects and distributes the projects to the worker nodes. The worker nodes process the projects and return the answer to the master node. As part of the reduce function, the master node collects the answers and combines them to provide an output. Map and reduce functions are performed using different types of resources including map and reduce slots that execute map and reduce tasks respectively. The MapReduce model includes a barrier between map and reduce stages. The reduce stage is executed after the map stage is completed. Thus, the execution of consecutive jobs in a MapReduce environment is pipelined. Once a first job finishes its map stage, the second job can start its map stage such that the reduce stage of the first job can overlap with the map stage of the second job.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a timeline illustrating an execution of two independent MapReduce jobs of a batch workload.

FIG. 3 is a timeline illustrating an execution of two independent MapReduce jobs of a batch workload as scheduled in a first order.

FIG. 4 is a timeline illustrating an execution of the two independent MapReduce jobs of a batch workload of FIG. 3 as scheduled in an order reverse that of the first order.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

The methods or processes described below can be included on one or more computer readable storage mediums storing computer executable instructions for controlling a processor, computing device, or distributed computing system to perform the method. Some example processes are described in terms of computer code or pseudo code, which can readily become computer executable instructions. Examples of computer readable storage mediums can include computer memory, storage devices, or other articles capable of tangibly storing computer executable instructions.

Figure 1:
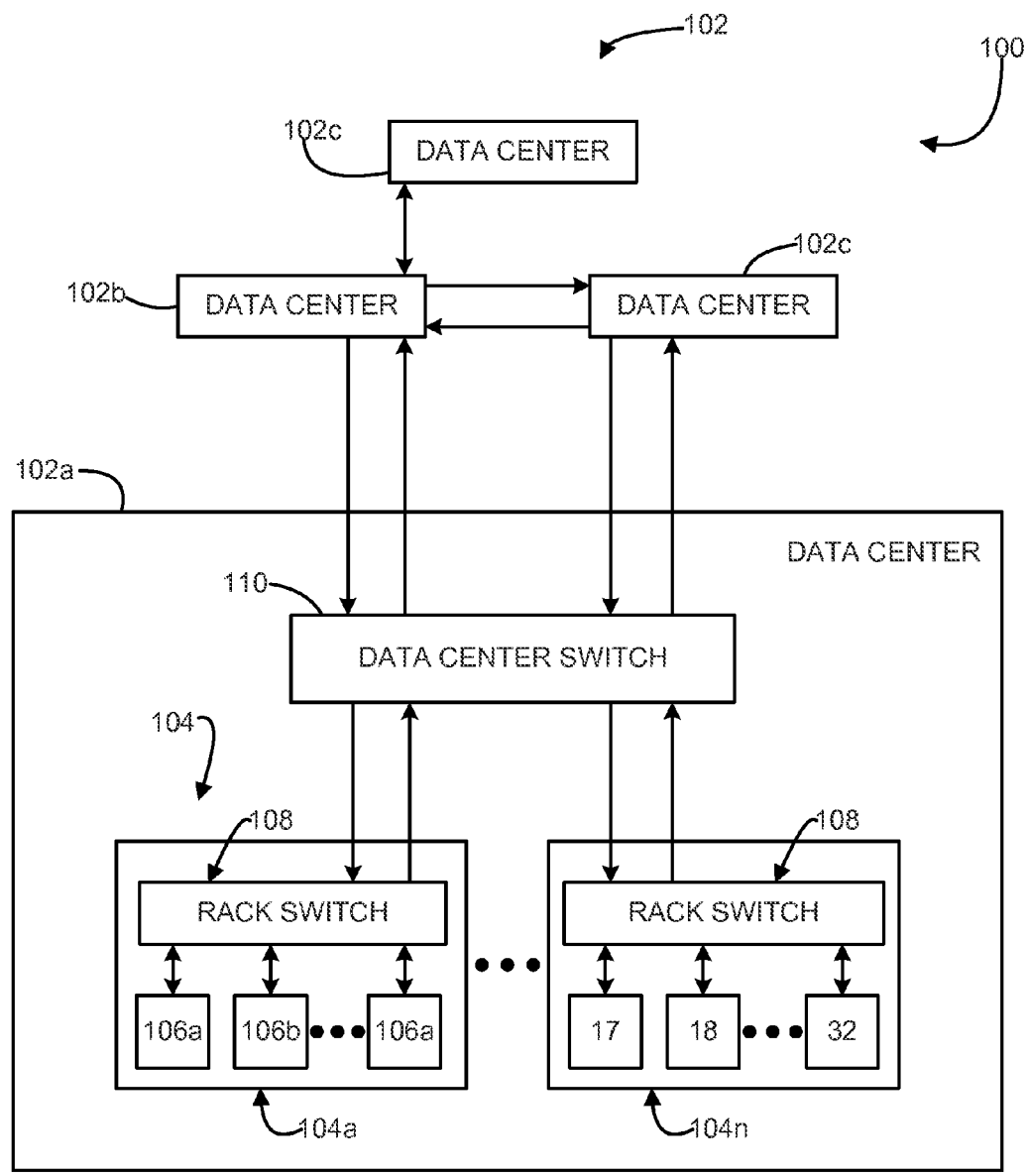
FIG. 1 is a block diagram illustrating an exemplary distributed processing system configured for use with a MapReduce framework.

FIG. 1 illustrates an exemplary distributed data processing system 100 configured to execute a MapReduce framework. The illustrated layout of system 100 is merely exemplary may take on any other suitable layout or configuration. System 100 is used to store data, perform computational tasks, and transmit data between one or more datacenters 102, such as the four example datacenters 102a, 102b, 102c, 102d. Some of the datacenters 102 may be located geographically close to each other, and others may be located far from the other datacenters. The system 100 may include dedicated communication channels, as well as supporting hardware. In some embodiments, the network 100 includes one or more wide area networks (WANs) as well as multiple local area networks (LANs). System 100 utilizes a private network, i.e., the system and its interconnections are designed and operated exclusively for a particular company or customer, a public network such as the Internet, or a combination of both.

Referring to example datacenter 102a, the datacenters 102 can be coupled to one another through a datacenter switch 110. In some examples, each datacenter switch 110 includes multiple racks 104, such as 104a to 104n in datacenter 102a. Each rack can include one or more processing devices or processors 106 or such as a central processing unit, general-purpose graphical processing unit cores, and others. In some examples, the processors 106 within each rack 104 are interconnected to one another through a rack switch 108. Furthermore, all racks 104 within each datacenter 102 can also be interconnected with a datacenter switch 110.

In this example, rack 104a includes processors 106a to 106n (worker processors 1-16) and rack 104n includes worker processors 17-32. The processors 106 can be coupled to other processors, local storage devices, network attached storage devices, and other computer-controlled devices that in some examples can be shared by more than one processor 106. In some embodiments, at least one of processors 106 operates as a master processor, and controls the scheduling and data distribution tasks performed throughout the network 100. In some embodiments, one or more processors 106 may take on one or more roles, such as a worker and/or a master processor. A rack can include storage (e.g., one or more network attached disks) that is shared by the one or more processors 106.

In the MapReduce model, computation is expressed as two functions: map and reduce. The map and reduce functions in the MapReduce model are both defined with respect to datasets structured in (key, value) pairs. The map function takes an input pair of data in one data domain and produces a list of intermediate key/value pairs in another domain. The map function is applied in parallel to the pairs in the input dataset. This produces a list of pairs for each call. The MapReduce model collects all pairs with the same key from all lists and groups them together, thus creating one group for each one of the different generated keys. The reduce function merges or aggregates all the values associated with the same key. The reduce function is then applied in parallel to each group, which in turn produces a collection of values in the same domain. Each reduce call typically produces either a value or an empty return, though one call is allowed to return more than one value. The returns of all calls are collected as the desired result list. Thus, the MapReduce framework transforms a list of (key, value) pairs into a list of values.

The map stage is partitioned into map tasks and the reduce stage is partitioned into reduce tasks. Each map task processes a logical split of input data that generally resides on a distributed file system. The map task reads the data, applies the user-defined map function on each record, and buffers the resulting output. In many examples, this data is sorted and partitioned for different reduce tasks, and written to the local disk of the machine executing the map task.

The reduce stage consists of three phases: shuffle phase, sort phase, and reduce phase. In the shuffle phase, the reduce tasks fetch the intermediate data files from the already completed map tasks following a pull model. In the sort phase, the intermediate files from the map tasks are sorted. An external merge sort is used in case the intermediate data does not fit in memory as follows: the intermediate data is shuffled, merged in memory, and written to disk. After the intermediate data is shuffled, a final pass is made to merge all these sorted files. Thus, the shuffle and sort phases are interleaved. For simplicity, the shuffle and sort phase activities are combined here under the shuffle phase. In the reduce phase, the sorted intermediate data is passed to the user-defined reduce function. The output from the reduce function is generally written back to the distributed file system.

The MapReduce framework provides a set of application-independent operators for reading input data and generating output data in many programming languages. The operators invoke library functions that automatically handle data partitioning, parallelization of computations, fault tolerance and recovery, and I/O scheduling. Application programmers provide information identifying the input files, information identifying or specifying the output files to receive output data, and two application-specific data processing operators, such as the map algorithm to specify how input data is to be processed to produce intermediate data and the reduce algorithm to specify how the intermediate data values are to be merged or otherwise combined.

MapReduce jobs are automatically parallelized, distributed, and executed on a distributed processing system such as a large cluster of commodity machines. A Hadoop cluster is currently a popular tool for distributing and processing data over a distributed processing system. Hadoop is an Apache Software Foundation open-source software project that implements the MapReduce framework. Hadoop processes large quantities of data by distributing the data among worker nodes in a cluster, and utilizing a mapreduce algorithm to process that data. A Hadoop cluster may include one or more worker nodes and at least one master node. In a Hadoop environment, the worker nodes may perform jobs or tasks of the map reduce algorithm and the master node may perform administrative functions of the map reduce algorithm such as to provide a point of interaction between an end-user and the cluster, manage job tasks, and regulate access to the file system. Although examples in this disclosure are discussed in the Hadoop environment, one skilled in the art can readily apply the concepts to other environments.

Job scheduling in Hadoop is performed by a master node, which manages a number of worker nodes in the cluster. Each worker has a fixed number of map slots and reduce slots, which run tasks. The number of map and reduce slots is typically statically configured (for example, one or two per core or disk). Each job can be represented as a set of n tasks processed by k slots. If the number of tasks is greater than the number of slots, the task assignment proceeds in multiple rounds, which are often referred to as waves. For example, a job having 64 tasks processed by 16 slots can be completed in 4 waves, and a job having 71 tasks processed by the 16 slots can be completed in 5 waves. The assignment of tasks to slots is done using a greedy algorithm that can assign each task to the slot that finished its running task the earliest. The worker nodes periodically send heartbeats to the master node to report the number of free slots and the progress of tasks that they are currently running. Based on the availability of free slots and the scheduling policy, the master node assigns map and reduce tasks to slots in the cluster.

Job scheduling is typically performed using one or several policies. In Hadoop, a scheduling policy can be performed with a job master node called JobTracker with a pluggable module. A scheduling policy dictates the ordering of jobs and the amount of allocated resources to different jobs over time. A common scheduling policy is FIFO, or the scheduler assigns the map or reduce tasks to the earliest arriving job. Another scheduling policy assigns the map or reduce task to the job with the earliest deadline. Still another scheduling policy uses the least amount of slots to complete the job before the deadline.

A typical production workload in a Hadoop cluster consists of a set of concurrent MapReduce jobs submitted in a batch form. A batch workload with no dependencies across jobs can be executed in any order. Typical scenarios in MapReduce environments include production jobs that are executed periodically, e.g., hourly, daily, or weekly. The job execution time and specifics of the execution depend on the amount of resources (map and reduce slots) allocated to the job. A job profile can be created for each job that is routinely or periodically executed on a new dataset in the MapReduce environment. The job profile can reflect performance characteristics of the underlying application during the execution phases from past executions in the environment. Metrics in the job profile can be obtained from the counters at the job master during execution or can be parsed from the logs. When jobs in a batch are ready to process new datasets, information extracted from the job profiles can be to compute new estimates of expected performance such as the expected durations of the map and reduce stage. For example, each MapReduce job $J_i$ is defined by durations of its map and reduce stages $m_i$ and $r_i$, with an abstraction $J_i = (m_i, r_i)$.

FIG. 2 illustrates a timeline 200 of an execution of two (independent) MapReduce jobs $J_1$ and $J_2$ in a Hadoop cluster with a typical FIFO scheduler. There are no data dependencies between these jobs. Once the first job $J_1$ completes its map stage $m_1$ and begins reduce stage $r_1$ processing, the next job can start its map stage $m_2$ execution with the released map resources in a pipelined fashion. There is an overlap 202 in executions of map stage $m_2$ of the next job $J_2$ and the reduce stage $r_1$ of the first job $J_1$. Further, there is a delay 204 in beginning the reduce stage $r_2$ of the second job $J_2$ because the map stage $m_2$ of the second job $J_2$ has completed executing before the reduce stage $r_1$ of the first job $J_1$ has released the reduce resources. Thus, the overall execution makespan of the two jobs $J_1$ and $J_2$ is represented along the timeline as 206.

Some execution orders of jobs in a batch workload can lead to significantly inefficient use of resources and increased processing time.

Consider, for example, a batch workload of jobs $J_1$ and $J_2$ where:

$$J_1 = (m_1, r_1) = (20s, 2s), \text{ and}$$

$$J_2 = (m_2, r_2) = (2s, 20s)$$

where s is a unit of time.

FIG. 3 illustrates a timeline 300 where the jobs $J_1$ and $J_2$ are scheduled in a first order, i.e., $J_1$ is scheduled before $J_2$, and FIG. 4 illustrates a timeline 400 where the jobs $J_1$ and $J_2$ are scheduled in a reverse order, i.e., $J_2$ is scheduled before $J_1$. In FIG. 3, where $J_2$ follows $J_1$, the reduce stage of $J_1$ overlaps 302 with the map stage of $J_2$ leading to overlap of only 2s. Thus, the total completion time 304 of processing two jobs is 20s+2s+20s=42s. In FIG. 4, where $J_1$ follows $J_2$, the reduce stage of $J_2$ overlaps 402 with the map stage of $J_1$ leading to a much better pipelined execution and a larger overlap of 20s. Thus, the total makespan 404 is 2s+20s+2s=24s.

As the illustrations suggest, a typical FIFO scheduler for a batch workload does not necessarily provide an efficient execution order MapReduce jobs. Other scheduling policies are directed to meeting deadlines rather than to providing efficient makespan. In many scheduling policies, however, the order in which the jobs are executed can have a significant impact on the batch completion time.

A more efficient scheduler can be constructed by applying the abstraction introduced above where $J_i = (m_i, r_i)$ for each job $J_i$ where $m_i$ represents the busy processing time of the map stage and $r_i$ represents the busy processing time of the reduce stage. Each job $J_i$ can include a duration attribute $D_i$ of either $(m_i, m)$ if $m_i$ is less than $r_i$ or $(r_i, r)$ if $r_i$ is less than $m_i$. In each duration attribute D—the first argument (either $m_i$ or $r_i$) is the stage duration of the minimum of the busy processing times $(m_i, r_i)$, and the second argument (either m or r) is the stage type of either map or reduce that corresponds to the stage duration argument.

Considering the jobs $J_1$ and $J_2$ in FIGS. 3 and 4 as an example, where $J_1 = (m_1, r_1) = (20s, 2s)$, and $J_2 = (m_2, r_2) = (2s, 20s)$, the duration attributes $D_i$ can be listed as:

$$D_1 = (2, r), \text{ and}$$

$$D_2 = (2, m)$$

In job $J_1$, the minimum busy processing time is 2s in the reduce stage, hence the duration stage argument is 2s, and the stage type is reduce stage r. In job $J_2$, the minimum busy processing time is 2s in the map stage, hence the duration stage argument is 2s, and the stage type is map stage m.

The following pseudo code represents a set of instructions that can be used to determine the estimated applicable metrics from the job profiles:

```
receive a batch workload of a set of n jobs,
for each job do
    // use the job profile to obtain the duration attribute for each job
    determine (likely) processing times for the map stage and
    reduce stage,
    apply the minimum of the processing times as a stage duration,
    apply the map stage or the reduce stage, whichever corresponds with
        the stage duration, as stage type,
end for each,
```

A set of jobs $\{J_1, J_2 \ldots J_n\}$ can be sorted in a relatively efficient order through each of the corresponding duration attributes $D_i$ in two steps. In a first step, the jobs are ordered in a temporary list where the minimum of stage duration $m_i$ or $r_i$ of job $J_i$ is less than the minimum of stage duration $m_{i+1}$ or $r_{i+1}$ of job $J_{i+1}$. In cases where the minimum stage durations of a subset of jobs are the same, the job having the stage attribute m is placed in the temporary order ahead of the job having the stage attribute r.

The following pseudo code represents a set of instructions for implementing the first step of a two-step scheduler on a list of n jobs from the duration attributes:

```
sort the n jobs in order of stage duration from smallest to greatest,
for each subset of jobs having the same stage duration do
    // sort jobs having the same stage duration by stage type
    sort jobs having stage type of m ahead of job having stage type of r
end for each,
output temporary list of the set of n jobs.
```

In the second step, the temporary list is reordered by stage type. If the stage type is a map stage m, the job is added to the front end of the reorder, and if the stage type is a reduce stage r, the job is added to the tail end of the reorder to obtain a final schedule.

The following pseudo code represents a set of instructions for implementing the second step of a two-step scheduler on the temporary list of n jobs from the duration attributes:

```
receive the temporary list of the set of n jobs,
head becomes 1,
tail becomes n,
for each job in the set do
    if the stage type is map stage, then
        // put the job from the front of the list,
        put job at the head,
        assign head to be head + 1,
    else
        // put the job from the tail of the list,
            put job at tail,
            tail becomes tail − 1,
    end if,
end for,
output a final schedule order.
```

The two-step scheduler described above is illustrated with an example of a batch workload. Table $T_1$ includes a batch workload of set of five jobs in order of, for example, being received by the scheduler ($J_1, J_2, J_3, J_4, J_5$). The table lists each job $J_i$ with its corresponding busy processing times for the map stage $m_i$ and the reduce stage $r_i$ as well as the corresponding duration attribute $D_i$ including the stage duration and stage type arguments.

TABLE $T_1$

| $J_i$ | $m_i$ | $r_i$ | $D_i$ |
|---|---|---|---|
| $J_1$ | 4 | 5 | (4, m) |
| $J_2$ | 1 | 4 | (1, m) |
| $J_3$ | 30 | 4 | (4, r) |
| $J_4$ | 6 | 30 | (6, m) |
| $J_5$ | 2 | 3 | (2, m) |

A temporary list can be determined using the corresponding metrics from Table $T_1$, by sorting the stage duration argument of the duration attributes Di from smallest to greatest. In the case of a subset of jobs having the same stage duration, the subset is ordered by stage type argument from map stage to reduce stage. A temporary list of the batch workload is listed in Table $T_2$.

TABLE $T_2$

| $J_i$ | $m_i$ | $r_i$ | $D_i$ |
|---|---|---|---|
| $J_2$ | 1 | 4 | (1, m) |
| $J_5$ | 2 | 3 | (2, m) |
| $J_1$ | 4 | 5 | (4, m) |
| $J_3$ | 30 | 4 | (4, r) |
| $J_4$ | 6 | 30 | (6, m) |

The temporary order is now ($J_2$, $J_5$, $J_1$, $J_3$, $J_4$) as sorted by the stage duration from smallest to greatest. The subgroup of jobs $J_1$ and $J_3$ include the same stage duration of 4 and are thus sorted by the stage type within the subgroup.

The temporary order according to Table $T_2$ is then used to determine the schedule order by sequentially assigning the jobs from either the front of the schedule or the tail of the schedule by stage type of the duration attribute. For example:

1. The first item in the temporary order is $J_2$, which is represented by duration attribute of (1, m). The stage type is m so $J_2$ is assigned from the head of the schedule, and the schedule in progress becomes ($J_2$, ... ).

2. The second item in the temporary order is $J_5$, which is represented by duration attribute (1, m). Again, $J_5$ is assigned from the head of schedule, and the schedule in progress becomes ($J_2$, $J_5$, ... ).

3. The third item in the temporary order is $J_1$, which is represented by the duration attribute of (4, m). Again, $J_1$ is assigned from the head of the schedule, and the schedule in progress becomes ($J_2$, $J_5$, $J_1$, ... ).

4. The fourth item in the temporary order is $J_3$ and is, on the other hand, represented by the duration attribute (4, r). The stage type is r so $J_3$ is assigned from the tail of the schedule, and the schedule in progress becomes ($J_2$, $J_5$, $J_1$, ... , $J_3$).

5. Finally, $J_4$ is represented by the duration attribute (1, m). The stage type is m so $J_4$ is assigned from the head of the schedule, i.e., after $J_1$, and the final schedule becomes ($J_2$, $J_5$, $J_1$, $J_4$, $J_3$).

The final schedule ($J_2$, $J_5$, $J_1$, $J_4$, $J_3$) in this illustration represents a minimum makespan according to the two-stage scheduler. The makespan of this order is 47 time units. In contrast, the worst makespan is defined as the reverse order of the final schedule ($J_3$, $J_4$, $J_1$, $J_5$, $J_2$,) and is 78 time units, which is a 66% increase over the minimum makespan. Further, the makespan in order of the jobs being received by the scheduler ($J_1$, $J_2$, $J_3$, $J_4$, $J_5$) is 73 time units. Thus, the final schedule according to the two-step scheduler can provide a significant savings over typical MapReduce schedulers.

The two-stage scheduler applies busy processing time of the stages in making the determination of the final schedule. In the case where each job utilizes either all the map slots or all the reduce slots during processing, the two-step scheduler provides an accurate final schedule for minimizing makespan of the batch workload. In common circumstances where some slots are not utilized or where some waves do not use all slots, waves of the next job may begin on resources not used in waves of the current job.

Figure 5:
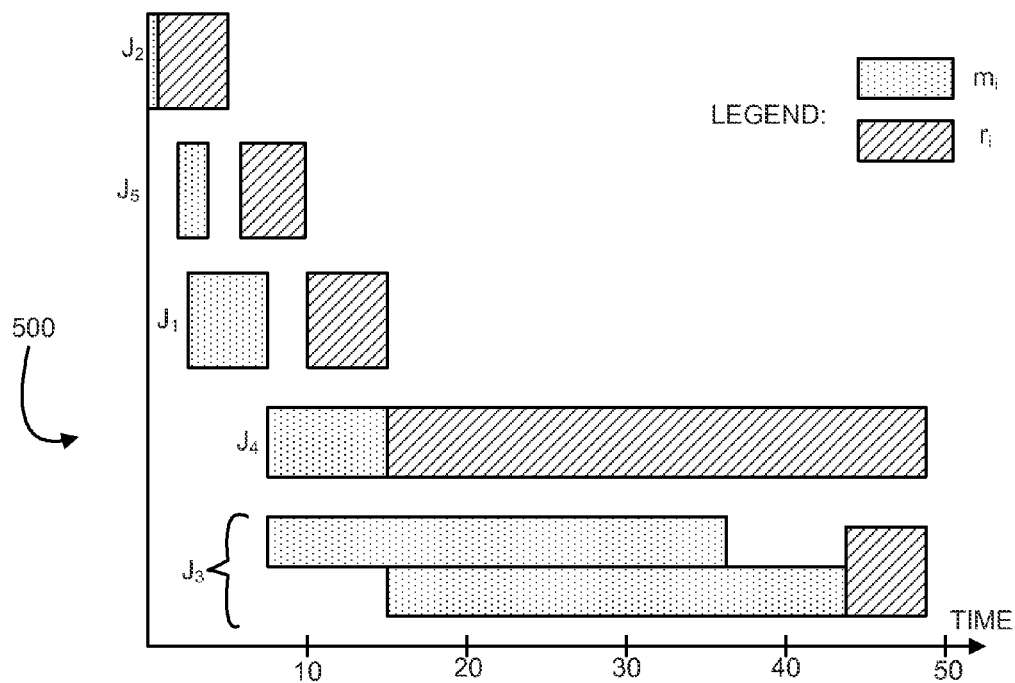
FIG. 5 is a timeline illustrating an execution of five independent MapReduce jobs of a batch workload in a given set of processing resources.

FIG. 5 illustrates a timeline 500 of the batch workload execution in order of the final schedule ($J_2$, $J_5$, $J_1$, $J_4$, $J_3$) in one example where the number of n tasks for each job $J_i$ is less than or equal to an integer multiple of the number of k available slots. In this example, let jobs $J_1$, $J_2$, and $J_5$ be comprised of 30 map and 30 reduce tasks, and jobs $J_3$ and $J_4$ be comprised of 20 map and 20 reduce tasks. The height of the stages reflects the amount of resources used by the jobs, the width represents the stage duration, and the jobs appear at the time line as they are processed by the schedule.

While the first three jobs $J_2$, $J_5$, and $J_1$ utilize all map and all reduce slots during processing, the last two jobs $J_4$ and $J_3$ only use 20 map and 20 reduce slots, and hence map stage processing of $J_3$ starts earlier than the map stage of $J_4$ is completed because there are 10 map slots available in the system. The first 10 tasks of $J_3$ are processed concurrently with 20 map tasks of $J_4$. When $J_4$ completes its map stage and releases 20 map slots, then the next 10 map tasks of $J_3$ get processed. This slightly modified execution, however, leads to the same makespan of 47 time units as above when resources and tasks are not considered because processing of the $J_3$ reduce stage cannot start until the map stage of $J_3$ is finished.

Rather than sequentially executing the final order over the available resources, the jobs can be spilt into multiple batches and executed concurrently. In addition to using the two-step scheduler to making the determination of final schedule based on stage durations, the jobs can further be partitioned into a plurality of pools based on resource allocation in order to further reduce makespan. In the example above, jobs $J_1$, $J_2$, and $J_5$ (which use 30 map and 30 reduce slots during processing) can be included in first pool comprising 10 map slots and 10 reduce slots. Jobs $J_3$ and $J_4$ only use 20 map and 20 reduce slots can be included in a second pool comprising the remaining 20 map and 20 reduce slots. In this configuration, the pools can be executed concurrently (where each set follows its own schedule) using all 30 map and 30 reduce slots available.

Figure 6:
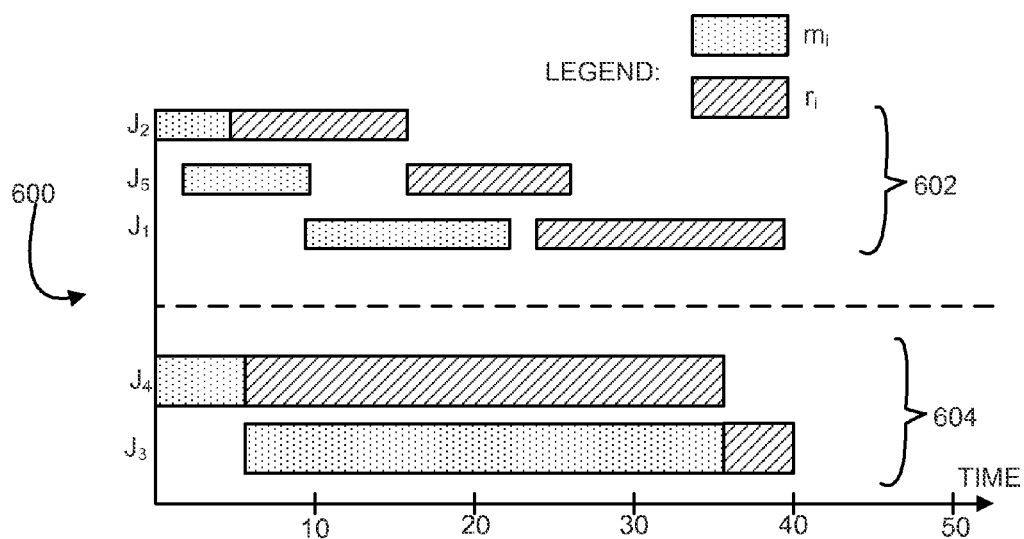
FIG. 6 is a timeline illustrating an execution of the five independent MapReduce jobs of FIG. 5 according to tailored resource allocations to reduce completion time.

FIG. 6 illustrates a timeline 600 of the batch workload execution when the jobs separated into first pool 602 including jobs $J_1$, $J_2$, and $J_5$ and second pool 604 including jobs $J_3$ and $J_4$. As above with respect to FIG. 5, the height of the stages reflects the amount of resources used by the jobs, the width represents the stage duration, and the jobs appear at the time line as they are processed by the schedule.

The two-stage scheduler is used to determine the optimized schedule for the jobs in each pool. Using the two-stage scheduler, the jobs in the first pool 602 are executed according to the order ($J_2$, $J_5$, $J_1$). The jobs in the second pool 604 are executed according to the order ($J_4$, $J_3$).

Each of the jobs of the first pool 602 has 30 map and 30 reduce tasks for processing as set forth above. When these 30 tasks of each job are processed with 10 slots, the execution takes three times longer. Both map and reduce stages for the jobs in the first pool 602 are processed in three waves as compared with a single wave for the stage execution with 30 slots in the example illustrated in FIG. 5. In this configuration of jobs order and resources, the makespan of the first pool 602 is 39 time units.

The execution of the first pool 602 in 10 slots makes 20 slots available for the execution of the second pool 604. As set forth above, each of the jobs of the second pool 604 has 20 map and 20 reduce tasks for processing. The second pool 604 of jobs can be executed concurrently with the first pool 602 of jobs in a single wave for the stage execution to use all 30 map and all 30 reduce slots at once. In this configuration of jobs order and the resources, the makespan of the second pool 604 is 40 time units. Because the pools 602, 604 are executed concurrently, the overall makespan for processing these five jobs is 40 time units, which is almost a twenty percent improvement compared to 47 time units using two-stage schedule without tailored concurrent pooling.

Whereas the two-stage scheduler provides an order based on stage duration, additional features can be added to the scheduler to also account for resource allocation. The following pseudo code represents a set of instructions for implementing tailored and balanced pools to further reduce makespan over the two-stage scheduler:

```
receive a list J of n MapReduce jobs each including duration attributes,
receive a number M of machines available for processing the jobs,
sort J based on an increasing number of map tasks
BestMakespan becomes Simulate(J, Scheduler(J), M)
For split becomes from 1 to n−1 do:
    // Partition J into a list of small jobs Jobs_A and big jobs Jobs_B
    Jobs_A becomes (J_1, ..., J_split),
    Jobs_B becomes (J_split+1, ..., J_n)
    SizeBegin becomes 1, SizeBegin becomes M
    // Binary search for pool size that balances completion times of pools
    repeat
        SizeMid becomes (SizeBegin + SizeEnd)/2
        Makespan_A becomes Simulate(Jobs_A, Scheduler(Jobs_A),
            SizeMid)
        Makespan_B becomes Simulate(Jobs_B, Scheduler(Jobs_B),
            M − SizeMid)
        if Makespan_A < Makespan_B then
            SizeEnd becomes SizeMid
        else
            SizeBegin becomes SizeMid
        end if
    Until SizeBegin does not equal SizeEnd
    Makespan becomes the maximum of Makespan_A, Makespan_B
    if Makespan < BestMakespan then
        BestMakespan becomes Makespan
    end if
end for
```

The process above methodically partitions the jobs into multiple subgroups of jobs, applies different pools of MapReduce resource allocations to the subgroups, and then compares the resulting makespans to determine the configuration of the subgroups and the resource pools that provide the shortest concurrent execution. The method looks for minimized makespans of approximately the same duration, i.e., balanced makespans, where the maximum makespan of an optimized set of pools is shorter than the maximum makespan in other combinations. In the example illustrated in FIG. 6, the maximum makespan is 40 time units, and the makespans of the resource pools are balanced in that the makespan of the first pool is 39 time units and the makespan of the second pool is 40 time units.

Within each resource pool, the two-stage scheduler, i.e., Scheduler( ) is used to order the jobs in the subgroups of jobs. The example above partitions jobs into two subgroups. Each subgroup is assigned an amount of resources. The pool makespan is estimated with a MapReduce simulator, such as SimMR available from Hewlett-Packard Company. Another MapReduce simulator is Apache Mumak. The process repeats for different configuration of resources. The subgroups are modified, and the jobs are reordered according to the two-stage scheduler. Repeatedly, the resource pools are modified and makespan is estimated again and again until an optimized makespan is determined. Once the optimized makespan is determined, the subgroup, the order of jobs within the subgroups, and the resource pools used for the jobs are identified, the batch workload can be scheduled for execution. An Apache Capacity scheduler allows resource partitioning into different pools with a separate job queue for each pool and can be used to execute the optimized schedule. In other examples, the jobs can be sorted into more than two concurrent pools.

The job execution with two pools is implemented using Performance benefits of the constructed schedule evaluated through extensive simulations over a variety of realistic workloads. The performance results are workload and cluster-size dependent, but tailored concurrent pools can typically achieve up to 20%-38% makespan improvements than a job order based on the two-step scheduler alone.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A non-transitory computer readable storage medium storing instructions for controlling a processor to perform a method, comprising:
   receiving a set of multi-stage jobs for processing in a MapReduce framework, wherein each job includes a duration attribute, and wherein each duration attribute includes an amount of stage duration and one of a plurality of stage types;
   separating resources in the MapReduce framework into a plurality of resource pools.
   separating the multi-stage jobs into a plurality subgroups corresponding with the plurality of resource pools, wherein the plurality of subgroups are configured for concurrent processing in the MapReduce framework; and
   for each subgroup, assigning an order for executing the multistage jobs in a schedule having a front and a tail, the assigning including:
      ordering the multi-stage jobs according to increasing amount of stage duration to generate an initially-ordered subgroup; and
      ordering the multi-stage jobs in the initially-ordered subgroup according to increasing amount of stage duration from the front of the schedule for multistage-jobs of a first stage type and the tail of the schedule for multi-stage jobs of a second stage type.

2. The computer readable storage medium of claim 1 wherein the multistage jobs in the subgroups and the resources in the resource pools are adjusted to reduce concurrent makespan for the schedules.

3. The computer readable medium of claim 2 wherein the multistage jobs in the subgroups and the resources in the resource pools are adjusted to minimize concurrent makespan for the schedules.

4. The computer readable storage medium of claim 1 wherein the one of the plurality of stage type refers either a first stage or a second stage, whichever corresponds with the minimum duration the stages.

5. The computer readable storage medium of claim 4 wherein the first stage of the multi-stage job completes processing before the second stage begins.

6. The computer readable storage medium of claim 1 wherein each of the multi-stage jobs in the set has no dependencies with the other multi-stage jobs in the set.

7. The computer readable storage medium of claim 1, the method comprising:
   causing the MapReduce framework to concurrently process the subgroups of the multi-stage jobs in the order of the schedule on the corresponding resource pools.

8. The computer readable storage medium of claim 7 wherein the schedules are provided to a master node of the MapReduce framework for concurrent processing.

9. The computer readable storage medium of claim 1 wherein the multi-stage jobs are two-stage jobs.

10. A processor-implemented method, comprising:
    receiving into a memory device a set of two-stage jobs for processing in a MapReduce framework, wherein each job the set includes a duration attribute, and wherein each duration attribute includes a stage duration and one of a plurality of stage types;

separating, with a processor, resources in the MapReduce framework into a plurality of resource pool;

separating, with the processor, the set of two-stage jobs into a plurality of subgroups corresponding with the plurality of resource pools, wherein the plurality of subgroups are configured for concurrent processing in the MapReduce framework; and for each of the subgroups, scheduling the two-stage jobs for executing in a schedule having a front and tail according to increasing stage duration from the front of the schedule for two-stage jobs of a first stage type and the tail of the schedule for two-stage jobs of a second stage type.

11. The method of claim 10 comprising:
combining different groups of two-stage jobs into a plurality of temporary subgroups to determine a minimum concurrent makespan.

12. The method of claim 11 wherein combining includes adjusting an amount of resources available for processing the two-stage jobs.

13. The method of claim 12 wherein combining includes adjusting the schedule of each subgroup.

14. The method of claim 13 wherein combining includes running MapReduce simulations on the two-stage jobs for each temporary subgroup in order of the schedule.

15. The method of claim 14 wherein combining includes running MapReduce simulations on the two-stage jobs for each of the combinations of the amount of resources.

16. The method of claim 10 wherein the plurality of subgroups is two subgroups.

17. The method of claim 10 comprising:
partitioning the two-stage jobs into multiple subgroups, applying different resource allocations of the MapReduce framework to the subgroups, and comparing resulting makespans to determine a configuration of the subgroups and an amount of resources that provide a minimum duration of concurrent execution of the subgroups.

18. A processor-implemented method, comprising:

Receiving into a memory device a set of two-stage jobs for processing in a MapReduce framework, wherein each job includes a duration attribute, and wherein each duration attribute includes an amount of stage duration and one of a plurality of stage types;

Separating, with a processor, the set of two-stage jobs into a plurality of subgroups of jobs, wherein the plurality of subgroups of jobs are configured for concurrent processing in the MapReduce framework; and for each of the subgroups, assigning, with the processor, an order for executing the multistage jobs in a schedule having a front and a tail, the assigning including
ordering the two-stage jobs in each of the subgroups of jobs according to increasing amount of stage duration to generate an initially-ordered list; and
ordering the two-stage jobs in the initially-ordered list according to increasing amount of stage duration from a front of the schedule by a first stage type and a tail of the schedule by a second stage type.

19. The method of claim 18 comprising separating the set of two-stage jobs into a plurality of subgroups of jobs, applying different resource allocations of the MapReduce framework to the separated set of two-stage jobs assigned in each of the plurality of subgroup of jobs, and comparing resulting makespans to determine a configuration of the subgroups of jobs and an amount of resources that provide a minimum duration of concurrent execution of the subgroups of jobs.

* * * * *